Patented Sept. 16, 1952

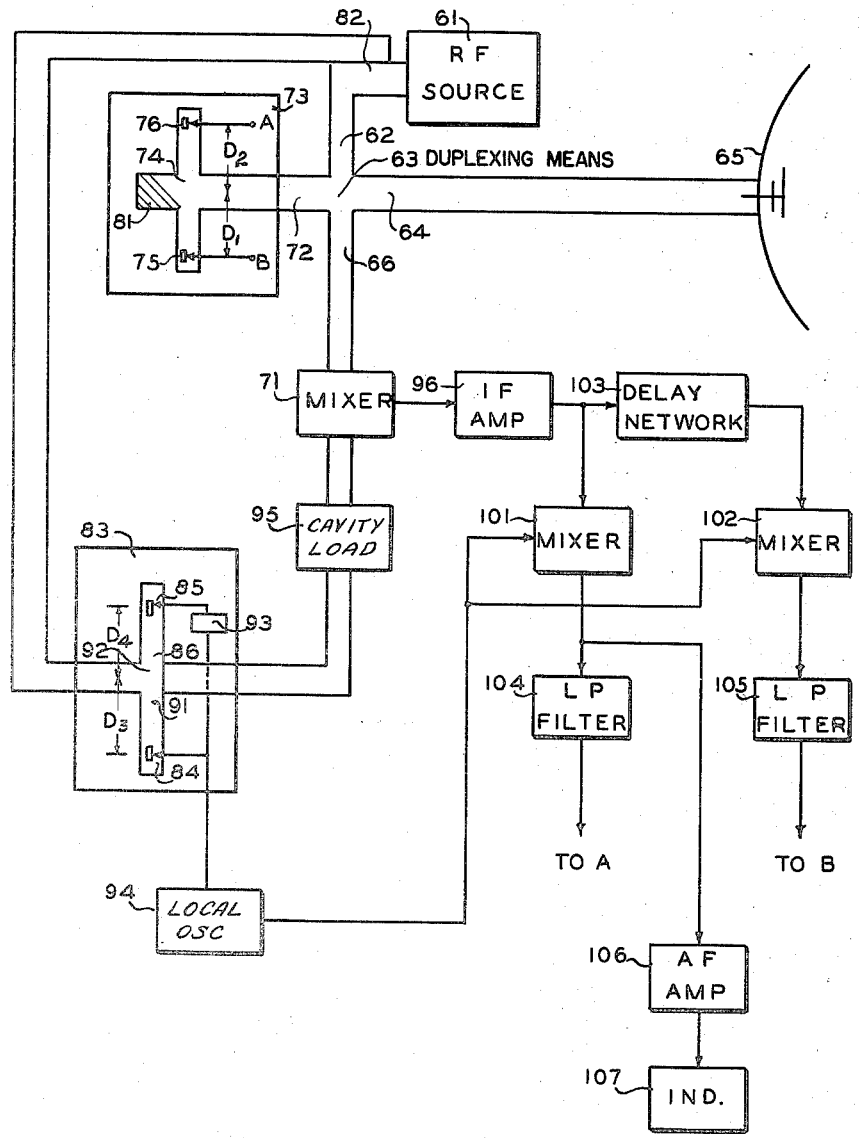

2,611,125

UNITED STATES PATENT OFFICE 2,611,125

DOPPLER RADAR SYSTEM

Robert H. Dicke, Cambridge, Mass., assignor, by mesne assignments, to the United States of America as represented by the Secretary of War Application May 30, 1945, Serial No. 596,726

5 Claims. (Cl. 343—8)

This invention relates to communication systems and more particularly to such systems as used for determining the relative velocities of two or more objects.

According to the theory of the Doppler effect, if a wave of energy of a given frequency emanates from one object and strikes another object, the observed frequency of the energy at the second object, or as observed when reflected back to the first object, will be different from the given frequency if the two objects are moving relative to each other. The change in frequency is proportional to the relative velocity of the two objects. This effect has been used to determine the velocities of objects such as projectiles and airplanes and to detect the presence of moving objects, men, vehicles, airplanes, etc. The complications inherent in such a system have limited their use heretofore to low power transmitters and relatively low gain receivers.

An object of the present invention is, therefore, to provide an improved system for detection of moving objects.

Another object of the present invention is to provide, in a system for detection of moving objects, a device for suppressing the center IF frequency to prevent overloading of the intermediate-frequency amplifier.

Another object of the present invention is to provide a system for detection of moving objects in which noise and other extraneous signals are minimized.

In accordance with the present invention a first oscillator is connected to a transmitting means and to a single sideband modulator. A receiving means is connected to a first mixer. A second oscillator, operating at the intermediate frequency, is connected to the single sideband modulator and to a second mixer. The single sideband modulator connects to the first mixer. The output of the first mixer connects to an intermediate-frequency amplifier which in turn feeds the second mixer. The second mixer feeds an indicator.

For a better understanding of the invention, together with other and further objects thereof, reference is had to the following description taken in connection with the accompanying drawings in which:

Fig. 3 is a diagram of an embodiment of the invention using a duplexing device, single antenna, and an automatic impedance matching device for reducing undesired signals.

Figure 1:
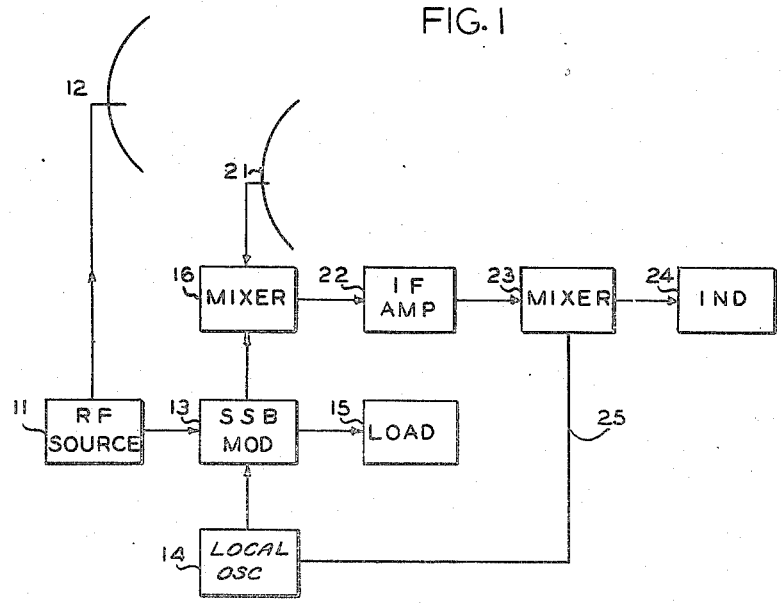
Fig. 1 is a diagram schematically showing an embodiment of the invention with separate transmitting and receiving antennae.

Referring now more particularly to Fig. 1 of the drawings, there is shown a Doppler type velocity detecting system having separate transmitting and receiving antennae. A source 11 of continuous wave (CW) radio frequency energy is connected to an antenna 12. The source 11 also feeds a single sideband modulator 13, preferably by use of a directional coupler, not shown. A local oscillator source 14 of intermediate-frequency (IF) energy also connects to the modulator 13. The modulator 13 may be a conventional mixer circuit with provision for eliminating the undesired sideband or it may be, as is preferable, a single sideband modulator such as is disclosed and claimed in the copending application of Robert H. Dicke, Serial No. 595,359, filed May 23, 1945, now Patent No. 2,496,521. A load 15 is connected to the modulator 13. The modulator 13 is also connected to a mixer 16. An antenna 21 also connects to the mixer 16. The mixer 16 connects to an IF amplifier 22 which in turn connects to a second mixer 23. The mixer 23 is connected to the source 14 and to an indicator 24. The mixers 16 and 23 may be any conventional type of frequency mixer, crystal, vacuum tube or other device. The indicator 24 may be any suitable indicator, preferably giving an indication proportional to input frequency. The preferred type is a frequency or spectrum analyzer such as disclosed and claimed in the copending application of Robert H. Dicke, Serial No. 581,696, filed March 8, 1945, now Patent No. 2,527,712. The preferences herein stated are not to be taken as limitations of the invention.

In the operation of the system of Fig. 1, the source 11 sends energy to the antenna 12 where it is radiated in a directional beam. When this radiated energy strikes an object, some energy is reflected. If the object is moving relative to the antennae 12 and 21, the energy returned to and received by the antenna 21 will differ in frequency from the transmitted energy. The received energy passes on to the mixer 16. A portion of the energy from the source 11 is combined in the modulator 13 with energy from the local oscillator 14. The modulator 13 produces an upper sideband of energy whose frequency is the sum of the two input frequencies, and a lower sideband of energy whose frequency is the difference of the two input frequencies. The load 15 is provided to absorb the undesired sideband. The remaining sideband is fed to the mixer 16 where it is mixed with the received energy. The energy received by the antenna 21 directly from the antenna 12 and from stationary objects combines with the energy from modulator 13 to produce a signal at the intermediate frequency. Energy received by the antenna 21 from moving objects combines with the energy from the modulator 13 to produce a signal having a frequency differing from the IF by the same amount the received signal frequency differs from the transmitted signal frequency. The output of the mixer 16 is fed to the amplifier 22 where it is amplified and fed to the mixer 23. In the mixer 23 these signals are combined with IF from source 14, which has a connection 25 to the mixer. In some cases the connection 25 may be omitted and the IF which is produced by stationary objects used at the mixer 23 instead. The output of the mixer 23 contains D. C. and audio components. The audio output is fed to the indicator 24 where it is effective, in accordance with its frequency, to produce an indication proportional to the velocity of the object observed.

Figure 2:
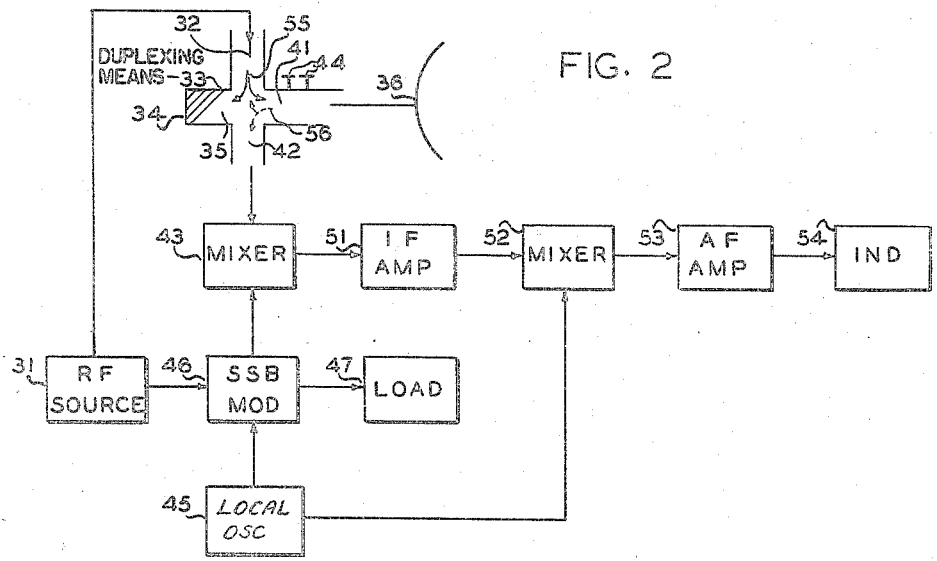
Fig. 2 is a diagram of an embodiment of the invention using a duplexing device and a single antenna for transmitting and receiving.

Referring now more particularly to Fig. 2 of the drawings, there is shown another embodiment of the invention which utilizes only one antenna and a duplexing device. A source 31, similar to source 11 of Fig. 1, connects to a branch 32 of the duplexing device 33. A load 34 terminates a branch 35 of the device 33 and an antenna 36 connects to a branch 41 of the device 33. A branch 42 of the device 33 connects to a mixer 43. The duplexing device may be any one of several such devices well known in the art. Tuning devices 44 permit adjustment of the device 33. A local oscillator 45 similar to local oscillator 14 of Fig. 1, connects to a modulator 46 similar to modulator 13 of Fig. 1. The modulator 46 is connected to the source 31, to the mixer 43 and to a load 47. The mixer 43 connects to an IF amplifier 51 which in turn connects to a mixer 52 which is similar to the mixer 23 of Fig. 1. The mixer 52 is connected to the local oscillator 45 and to an audio amplifier 53. The amplifier 53 feeds an indicator 54 which is similar to the indicator 24 of Fig. 1.

The operation of this system is the same in general as the system of Fig. 1. Energy from the source 31 passes into the duplexing device 33. This energy divides as shown by the solid arrows 55. Part of the energy is absorbed by the load 34 and the remainder passes on to the antenna 36 where it is radiated. The tuners 44 are adjusted so that none of this transmitted energy passes to the mixer 43. The received energy from antenna 36 divides as indicated by the dashed arrows 56. Part of the energy passes back into the source 31 where it will be absorbed and the remainder passes into the mixer 43. It can be shown that if the antenna 36 is twice the size of the antenna 12 or 21, the same energy will be transmitted to and received from any given object despite the fact that both in transmission and reception one-half of the energy is lost. In the mixer 43 received energy is combined with energy from the modulator 46 as described in detail for Fig. 1. The output of the mixer 43 is fed to the IF amplifier 51. As was stated in the discussion of the system of Fig. 1, reflections from stationary objects will produce energy at the intermediate frequency in the output of mixer 43. This energy may be troublesome if present in sufficient quantity to cause an amplifier to be saturated or overdriven. Therefore, it is desirable that the amplifier 51 have low gain to prevent this saturation. The output of the amplifier 51 feeds the mixer 52 where it is combined with energy from the local oscillator 45 to produce D. C. and audio signals. The mixer 52 drives the high gain audio amplifier 53. If IF amplifiers 51 are low gain, it is necessary to have the high gain audio amplifier 53 to raise the signals to a sufficiently high level to operate the indicator 54. At the indicator 54 the frequency of the audio signals determines the indicated velocity of observed objects. This embodiment is not limited to the low gain IF and high gain audio amplifier as shown but may be used as in Fig. 1 with the addition of the duplexing device 33.

Referring now more particularly to Fig. 3 of the drawings, there is shown an embodiment of the invention with provisions for maintaining the signal received from stationary objects at a minimum. This system comprises a source 61, similar to the source 11 of Fig. 1, connected to a branch 62 of a duplexing device 63. The duplexing device 63 is similar to the device 33 of Fig. 2. A terminal 64 of the device 63 connects to an antenna 65 or other radiating-receiving device. A terminal 66 of the device 63 connects to a mixer 71 which is similar to the mixer 16 of Fig. 1. A terminal 72 of the device 63 connects to a load 73. The load 73 consists of a T-bridge or "magic-T" 74 which may be similar in construction to the device 63 but fitted with loads, preferably silicon crystals, 75 and 76 located in the symmetrical branches of the magic-T at electrical distances $D_1$ and $D_2$ from the center of the magic-T 74. The distance $D_1$ exceeds the distance $D_2$ by an odd number of eighth wavelengths. Input terminals to the loads 75 and 76 are labeled A and B. A load 81 terminates the remaining branch of the magic-T 74. The source 61 is also connected through a directional coupler 82 to a single sideband modulator 83. The modulator 83 comprises two mixers 84 and 85 inserted in the symmetrical branches 86 and 91 of a magic-T 92 at distances $D_3$ and $D_4$ from the center of the magic-T 92. The distances $D_3$ and $D_4$ differ by one-eighth wavelength. The mixers 84 and 85 are separated at the intermediate frequency by a quarter wave delay line 93, the mixer 84 being connected to a local oscillator source 94 of IF energy. The circuit represented in block 83 is disclosed and claimed in the above mentioned copending application of Robert H. Dicke, Serial No. 595,359, filed May 23, 1945. The output of the modulator 83 connects to the mixer 71. In some cases it may be desirable to make this connection through a selective cavity 95. The selective cavity 95 forms a load circuit which is highly selective in the frequency of energy which it allows to pass through it. It might be called a very narrow band-pass filter. The mixer 71 connects to an IF amplifier 96 which connects to a mixer 101 directly and to a mixer 102 through a quarter wave delay line 103. The mixers 101 and 102 are connected to the source 94 and to low pass filters 104 and 105. The outputs of the filters 104 and 105 are labeled "to A" and "to B" and connect to terminals A and B respectively of the load 73. In addition, the mixer 101 connects to an audio amplifier 106 which feeds an indicator 107. The indicator 107 is similar to the indicator 24 of Fig. 1. This invention is not limited to the use of the type of single sideband modulator shown.

The operation of the system of Fig. 3 is similar to the operation of the system of Fig. 2. Only those parts which differ will be discussed. The mixer 71 may be a balanced mixer or a conventional single element mixer. If a balanced mixer is used, the use of the cavity load circuit 95 is recommended. Stationary objects, and especially nearby objects, cause the antenna impedance to vary as searching is accomplished. This variation of antenna impedance results in unbalance at the duplexer 63. The undesirable intermediate-frequency energy produced in the IF channel by these changes in the antenna impedance is minimized by changing the impedance of the load 73 automatically in accordance with the output of the low pass filters 104 and 105. The addition of delay line 103 and the extra mixer 102 in conjunction with the filters 104 and 105 make it possible to maintain the load 73 automatically matched to the antenna 65 and thus minimize the undesired IF energy. In the design of the apparatus it is necessary that the proper phase relationships be attained to provide inverse feedback from the filters 104 and 105 to the load 73, through the mixer 71, IF amplifier 96 and back to filters 104 and 105.

While all three embodiments herein shown and described have been treated from the standpoint of a Doppler type system employing continuous wave transmission, the device will operate equally well if frequency modulation is used. No changes in the electrical circuits are necessary other than changing of the type of radio frequency source used.

While there have been described what are at present considered the preferred embodiments of the invention, it will be obvious to those skilled in the art that various changes and modifications may be made therein without departing from the invention.

I claim:

1. A communication system for determining the relative velocity of two or more objects comprising duplexing means, a transmitting oscillator connected to said duplexing means, radiating means connected to said duplexing means, variable loading means connected to said duplexing means and having first and second input means, a local oscillator, a single sideband modulator connected to said transmitting oscillator and said local oscillator, a first mixer connected to said duplexing means and to said modulator, a first amplifier connected to the output of said first mixer, a second mixer connected to the output of said first amplifier and to said local oscillator, first filter means connecting a portion of the output of said second mixer to said first input means of said loading means; a second amplifier connected to a portion of the output of said second mixer, an indicator adapted to utilize the output of said second amplifier, delay means connected to the output of said first amplifier, a third mixer connected to the outputs of said delay means and said local oscillator, and second filter means connecting the output of said third mixer to said second input means of said loading means, whereby said indicator indicates the velocity of a reflecting object relative to said radiating means.

2. A communication system for determining the relative velocity of two or more objects comprising duplexing means, transmitting oscillator means connected to said duplexing means, radiating means connected to said duplexing means, local oscillator means, single sideband modulator means connected to said transmitting oscillator means and to said local oscillator means, loading means connected to said modulator means, first mixer means connected to said duplexing means and said modulator means, second mixer means, first amplifier means connecting said first mixer means to said second mixer means, said second mixer means being also connected to said local oscillator means, indicator means, and second amplifier means connecting said second mixer means to said indicator means, said indicator means being adapted to utilize the output of said second amplifier means to indicate velocity of a reflecting object relative to said radiating means.

3. A communication system for determining the relative velocity of two or more objects comprising transmitting oscillator means, means for radiating and receiving connected to said oscillator means, local oscillator means, single sideband modulator means connected to said transmitting oscillator means and to said local oscillator means; means for absorbing the unwanted output frequencies of said modulator means coupled to said modulator means, first mixer means connected to said means for radiating and receiving and said modulator means, second mixer means coupled to said local oscillator means, amplifier means coupling said first mixer means to said second mixer means, and indicator means adapted to utilize the output of said second mixer means.

4. A communication system for determining the relative velocity of two or more objects comprising duplexing means, first oscillator means connected to said duplexing means, radiating means connected to said duplexing means, variable loading means connected to said duplexing means and having first and second input means, second oscillator means, modulator means connected to said first and second oscillator means, first mixer means connected to said duplexing means, frequency selector means connected between said modulator means and said first mixer means, first amplifier means connected to the output of said first mixer means, second mixer means connected to the output of said first amplifier means and to said second oscillator means, first filter means connecting a portion of the output of said second mixer means to said first input means of said loading means, delay means connected to the output of said first amplifier means, third mixer means connected to the output of said delay means and said second oscillator means, second filter means connecting the output of said third mixer means to said second input means of said loading means, second amplifier means connected to a portion of the output of one of said second and third mixer means, and indicator means adapted to utilize the output of said second amplifier means.

5. A communication system for determining the relative velocity of two or more objects comprising duplexing means, transmitting oscillator means connected to said duplexing means, radiating means connected to said duplexing means, local oscillator means; single sideband modulator means connected to said transmitting oscillator means and to said local oscillator means, loading means connected to said modulator means, first mixer means connected to said duplexing means and said modulator means, second mixer means coupled to said local oscillator means, amplifier means coupling said first mixer means to said second mixer means, and indicator means adapted to utilize the output of said second mixer means.

ROBERT H. DICKE.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,435,569 | Barrow | Feb. 10, 1948 |
| 2,479,568 | Hansen | Aug. 23, 1949 |

FOREIGN PATENTS

| Number | Country | Date |
|---|---|---|
| 472,891 | Great Britain | Sept. 29, 1937 |